US010041388B2

(12) United States Patent
Chung

(10) Patent No.: US 10,041,388 B2
(45) Date of Patent: Aug. 7, 2018

(54) EXHAUST VALVE FOR MUFFLER AND MUFFLER INCLUDING THE SAME

(71) Applicant: WOOSHIN INDUSTRIAL CO., LTD., Dangjin-si, Chungcheongnam-do (KR)

(72) Inventor: Tae-sung Chung, Suwon-si (KR)

(73) Assignee: WOOSHIN INDUSTRIAL CO., LTD., Dangjin-si (KR)

( * ) Notice: Subject to any disclaimer, the term of this patent is extended or adjusted under 35 U.S.C. 154(b) by 0 days.

(21) Appl. No.: 15/291,800

(22) Filed: Oct. 12, 2016

(65) Prior Publication Data

US 2017/0107875 A1 Apr. 20, 2017

(30) Foreign Application Priority Data

Oct. 14, 2015 (KR) ........................ 10-2015-0143574

(51) Int. Cl.

| | |
|---|---|
| ***F01N 1/16*** | (2006.01) |
| ***F02D 9/04*** | (2006.01) |
| ***F02D 9/10*** | (2006.01) |
| ***F16K 1/22*** | (2006.01) |
| ***F16K 1/36*** | (2006.01) |
| ***F16K 35/04*** | (2006.01) |
| ***G10K 11/16*** | (2006.01) |
| *F01N 1/00* | (2006.01) |
| *F02D 9/00* | (2006.01) |
| *F16K 1/16* | (2006.01) |

(52) U.S. Cl.

CPC ............. *F01N 1/165* (2013.01); *F01N 1/161* (2013.01); *F01N 1/166* (2013.01); *G10K 11/161* (2013.01); *F01N 2240/36* (2013.01)

(58) Field of Classification Search

CPC ..... F16K 1/20; F16K 1/22; F16K 1/36; F16K 1/482; F16K 35/04; F02D 9/04; F02D 9/10; F02D 9/1025; F02D 9/1065; F01N 1/16; F01N 1/18; F01N 1/163; F01N 1/165; F01N 1/166; F01N 2240/36

USPC .................................................. 181/254, 237

See application file for complete search history.

(56) References Cited

U.S. PATENT DOCUMENTS 5,801,343 A * 9/1998 Suzuki ...................... F01N 1/02 181/254
6,176,347 B1 * 1/2001 Chae ....................... F01N 1/165 181/254
6,581,721 B2 * 6/2003 Nagai ..................... F01N 1/165 137/527.4
6,637,449 B2 * 10/2003 Nagai ....................... F01N 1/08 137/15.18

(Continued)

FOREIGN PATENT DOCUMENTS

FR 2237100 A1 * 2/1975 ............... F16K 1/22
JP 58217714 A * 12/1983 ............. F01N 1/165

(Continued)

*Primary Examiner* — Edgardo San Martin

(74) *Attorney, Agent, or Firm* — Novick, Kim & Lee, PLLC; Jae Youn Kim

(57) ABSTRACT

An exhaust valve for a muffler which is mounted inside the muffler includes: a mounting bracket having an arc shape; a shaft which is rotatably connected to the mounting bracket; a flap which is fixed to the shaft and rotates together with the shaft; and an elastic member which elastically support the flap with respect to the mounting bracket.

15 Claims, 11 Drawing Sheets

(56) References Cited

U.S. PATENT DOCUMENTS

| | | | | |
|---|---|---|---|---|
| 6,736,160 | B2 * | 5/2004 | Nagai | F01N 1/165 137/527 |
| 7,805,933 | B2 * | 10/2010 | Hanitzsch | F02B 27/06 137/527 |
| 8,056,673 | B2 * | 11/2011 | Zelinski | F01N 13/004 181/227 |
| 9,279,511 | B2 * | 3/2016 | Bagge | F16K 1/20 |
| 9,376,947 | B2 * | 6/2016 | Abram | F01N 1/08 |
| 9,388,734 | B2 * | 7/2016 | Mayer | F16K 31/047 |
| 9,464,559 | B2 * | 10/2016 | Middleton, Jr. | F01N 13/08 |

FOREIGN PATENT DOCUMENTS

| | | | | | |
|---|---|---|---|---|---|
| JP | 2007-192087 | A | | 8/2007 | |
| JP | 2013108368 | A | * | 6/2013 | F01N 1/166 |
| JP | 2014-520993 | A | | 8/2014 | |
| JP | 5692016 | B2 | * | 4/2015 | F01N 1/166 |
| JP | WO 2015111334 | A1 | * | 7/2015 | F01N 13/087 |
| JP | WO 2016047690 | A1 | * | 3/2016 | B60K 15/04 |
| KR | 10-0325741 | B1 | | 3/2002 | |
| KR | 10-2014-0137779 | A | | 12/2014 | |
| KR | 10-2015-0008172 | A | | 1/2015 | |
| WO | WO 0150047 | A1 | * | 7/2001 | F02D 9/04 |
| WO | WO 2011017407 | A2 | * | 2/2011 | F01M 13/0011 |
| WO | WO 2013115434 | A1 | * | 8/2013 | F02D 9/04 |
| WO | WO 2016126906 | A1 | * | 8/2016 | F01N 13/08 |

* cited by examiner

-PRIOR ART-

EXHAUST VALVE FOR MUFFLER AND MUFFLER INCLUDING THE SAME

CROSS-REFERENCE TO RELATED APPLICATION

This application claims priority to and the benefit of Korean Patent Application No. 10-2015-0143574 filed in the Korean Intellectual Property Office on Oct. 14, 2015, the entire contents of which are incorporated herein by reference.

TECHNICAL FIELD

The present invention relates to a muffler which is used in an exhaust system of a vehicle, an industrial machine and the like.

BACKGROUND ART

Generally, a muffler is a device for reducing noise of exhaust gas and is applied to an exhaust system of a vehicle, an industrial machine, or the like.

A muffler generally includes a body having a hollow inner space, a partitioning wall which partitions the inner space of the body and has a plurality of through holes, an inlet pipe which introduces exhaust gas into the body, and an outlet pipe which discharges the exhaust gas in the body. In such a muffler, exhaust gas is introduced via the inlet pipe and passes through the through holes of the partitioning wall and is finally discharged via the outlet pipe. However, the size and the position of the through hole are fixed, so flow of exhaust gas cannot be suitably regulated depending on engine RPM.

In order to solve this problem, a muffler disclosed in Korean Patent No. 0325741, as shown in FIG. 11, includes a shell 3 forming a body, a plurality of partitioning walls 4*a*, 4*b* and 4*c* partitioning an inner space of the shell 3 and having a plurality of porous pipes 5*a*, 5*b* and 5*c*, an inlet pipe 1 which introduces exhaust gas into the body, a plurality of outlet pipes 2*a* and 2*b* which discharges exhaust gas, an opening/closing valve 6 which is disposed at a frontal end of one outlet pipe 2*b* of the outlet pipes, a compressed air source 8 which is an actuator for driving the opening/closing valve 6, and an ECU 7 which operates the compressed air source 8 in response to an engine RPM to regulate the opening/closing valve. Accordingly, flow of exhaust gas is regulated in response to an engine RPM so that noise of exhaust gas and back pressure can be reduced.

However, since in such a conventional muffler the actuator 8 and the ECU 7 are separately provided and the opening/closing valve 6 is forcibly operated, the muffler is complicated due to these elements and design freedom is limited, and manufacturing cost is also increased.

DETAILED DESCRIPTION OF THE INVENTION

Technical Problem

The present invention has been made in an effort to provide an exhaust valve for a muffler and a muffler including the same which can regulate an opening amount depending on the pressure of exhaust gas so as to maintain an output of an engine and to reduce exhaust noise without an actuator and an ECU.

Technical Solution

An exhaust valve for a muffler which is mounted inside the muffler according to an embodiment of the present invention includes: a mounting bracket having an arc shape; a shaft which is rotatably connected to the mounting bracket; a flap which is fixed to the shaft and rotates together with the shaft; and an elastic member which elastically support the flap with respect to the mounting bracket.

Both end portions of the shaft may be rotatably connected respectively to both end portions of the mounting bracket.

The shaft may be disposed to be offset from a center of the flap.

Insert holes may be formed in both end portions of the mounting bracket, and the shaft may be disposed to be inserted into the insert holes.

The exhaust valve may further include a stopping unit which stops rotation of the flap.

The stopping unit may include: a stopping lever one end of which is fixed to one end of the shaft so as to rotate together with the shaft; and a stopping protrusion which is fixed to the mounting bracket to block the stopping lever when the flap is in a closing position.

The stopping unit may further include a noise reducing member which is provided to the stopping lever or the stopping protrusion to reduce noise when the stopping lever collides with the stopping protrusion.

The exhaust valve may further include a seating portion which allows a portion of the shaft to be stably seated to the flap.

The elastic member may be a torsion spring which is wound around the shaft, and the seating portion may be provided to the flap to be protruded therefrom to provide a gap between the shaft and the flap so that the torsion spring smoothly operates in the gap between the shaft and the flap.

The seating portion may be disposed to be offset from a center portion of the shaft. The torsion spring may include: a first end portion which is fixed to the mounting bracket; a second end portion which is elastically supported by the flap; and a center portion which is wound around the shaft in a type of a coil and is disposed between the first end portion and the second end portion.

The seating portion may be disposed in a center portion of the shaft. The torsion spring may include: a first portion which is fixed to the mounting bracket and forms an end; a second portion which is elastically supported by the flap and forms a center portion; a third portion which is fixed to the mounting bracket and forms the other end; a fourth portion which is wound around the shaft at one side portion about the center portion in a type of a coil between the first and the second portions; and a fifth portion which is wound around the shaft at the other side portion about the center portion in a type of a coil between the second the third portions.

The second portion of the torsion spring may have a curved shape so as to sufficiently support the flap.

The seating portion may be integrally formed to the flap to be protruded, and a portion of the shaft may be fixed to the seating portion.

The seating portion may be a damper which is separately provided to the flap and absorbs vibration, and one surface of the damper may be fixed to the shaft and the other surface of the damper may be fixed to the flap.

A muffler according to an embodiment of the present invention includes: a muffler body having a hollow inner space; a partitioning wall which partitions the inner space of the muffler body into a plurality of spaces; an inlet pipe which introduces exhaust gas into the muffler body; and an outlet pipe which discharges the exhaust gas in the muffler body. A first mounting hole is formed in the inlet pipe or the outlet pipe along a circumferential direction thereof, and the exhaust valve of one of claim 1 to claim 14 is mounted to the first mounting hole.

The flap may be inserted into the first mounting hole, and the mounting bracket may be fixed to an outer surface of the inlet pipe or the outlet pipe in a state of covering the first mounting hole.

The muffler may further include an auxiliary pipe which penetrates the partitioning wall, and a second mounting hole may be formed in the auxiliary pipe along a circumferential direction thereof and the exhaust valve may be mounted to the second mounting hole.

Advantageous Effects

Since the mounting bracket, the shaft, the flap and the elastic member are designed as described above, the elastic force of the elastic member can regulate the opening amount of the flap in conformation with the pressure of exhaust gas by the harmony of the pressure of exhaust gas introduced into the muffler via an outlet pipe and the elastic force of the elastic member in a state of an idling state or a low RPM state of an engine, so that the exhaust noise can be reduced while maintaining an engine output, and in a state of a high RPM of an engine, the pressure of exhaust gas becomes much higher than the elastic force of the elastic member, so the opening amount of the flap can be maximized so that the engine output may be maintained just like in a state that there is no exhaust valve.

DETAILED DESCRIPTION OF THE EMBODIMENTS

Hereinafter, embodiments of the present invention will be described in detail with reference to the accompanying drawings. However, the present invention can be realized in various manners and is not limited to the embodiments which will be described.

Figure 1:
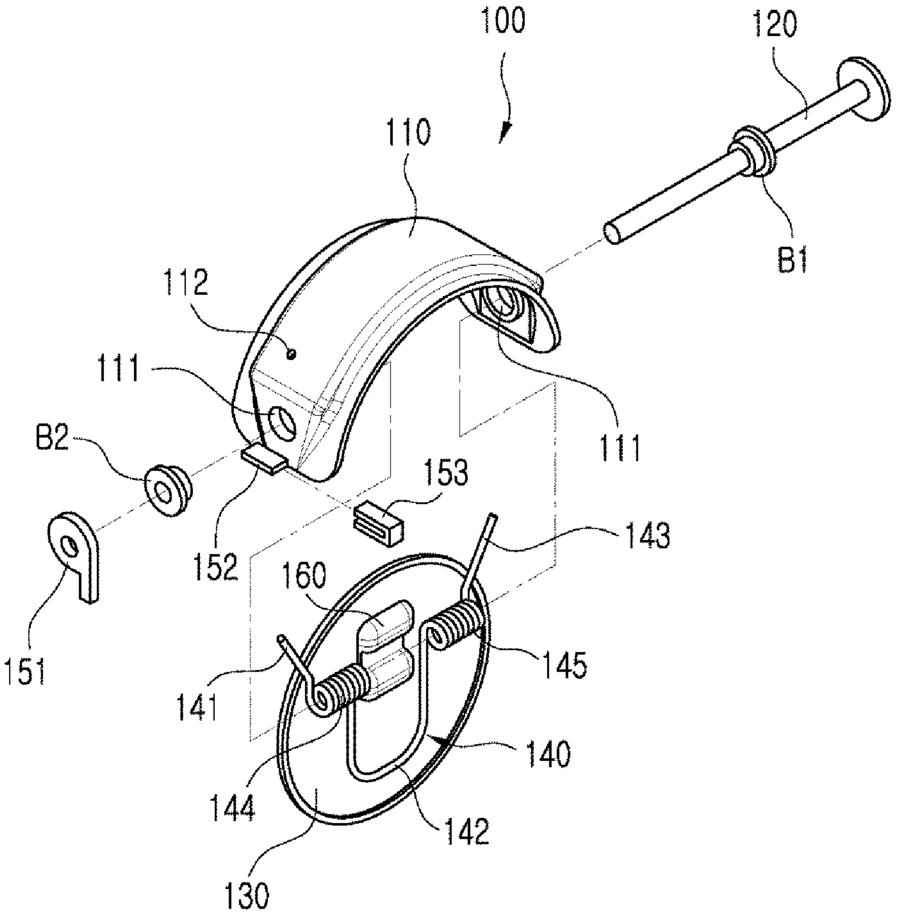
FIG. 1 is an exploded perspective view schematically showing an exhaust valve for a muffler according to an embodiment of the present invention.
Figure 2:
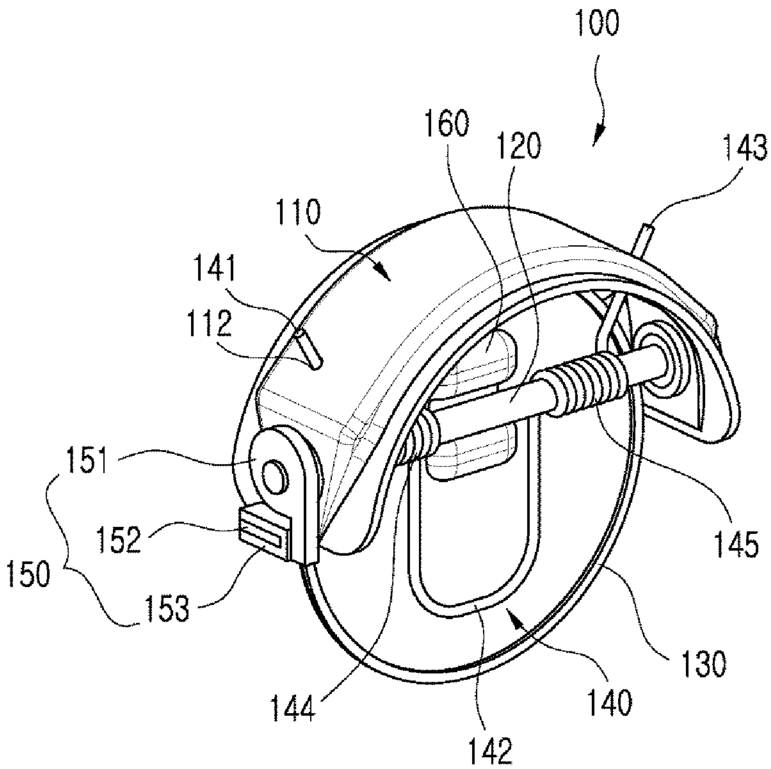
FIG. 2 is a perspective view of an exhaust valve for a muffler of FIG. 1.

FIG. 1 is an exploded perspective view schematically showing an exhaust valve for a muffler according to an embodiment of the present invention, and FIG. 2 is a perspective view of an exhaust valve for a muffler of FIG. 1.

Figure 3:
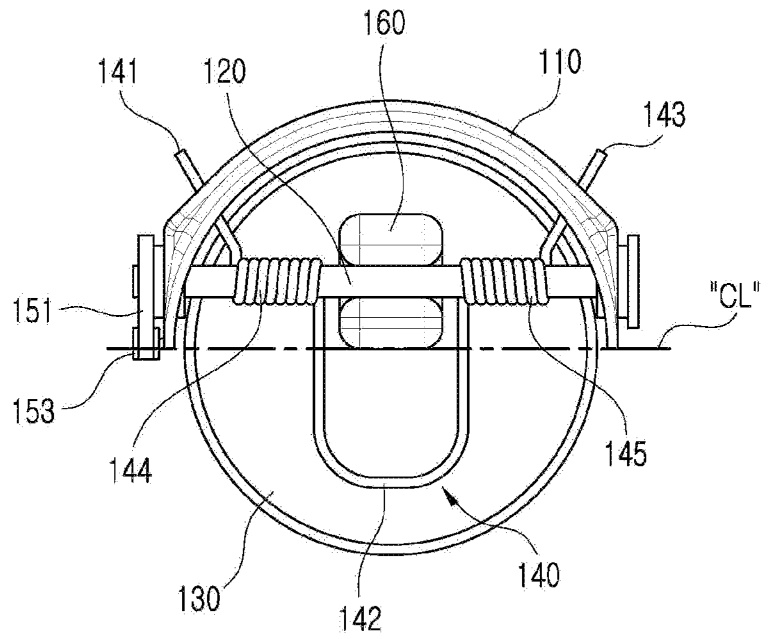
FIG. 3 is a front elevational view of an exhaust valve for a muffler of FIG. 2.
Figure 4:
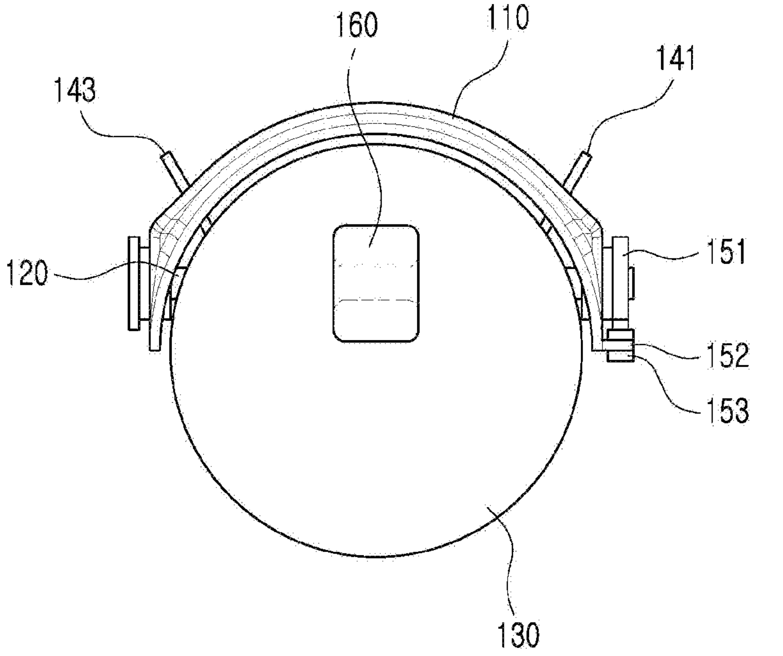
FIG. 4 is a rear elevational view of an exhaust valve for a muffler of FIG. 2.
Figure 5:
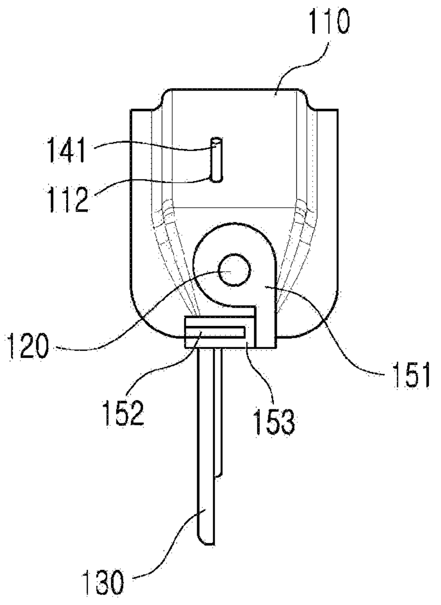
FIG. 5 is a left elevational view of an exhaust valve for a muffler of FIG. 2.
Figure 6:
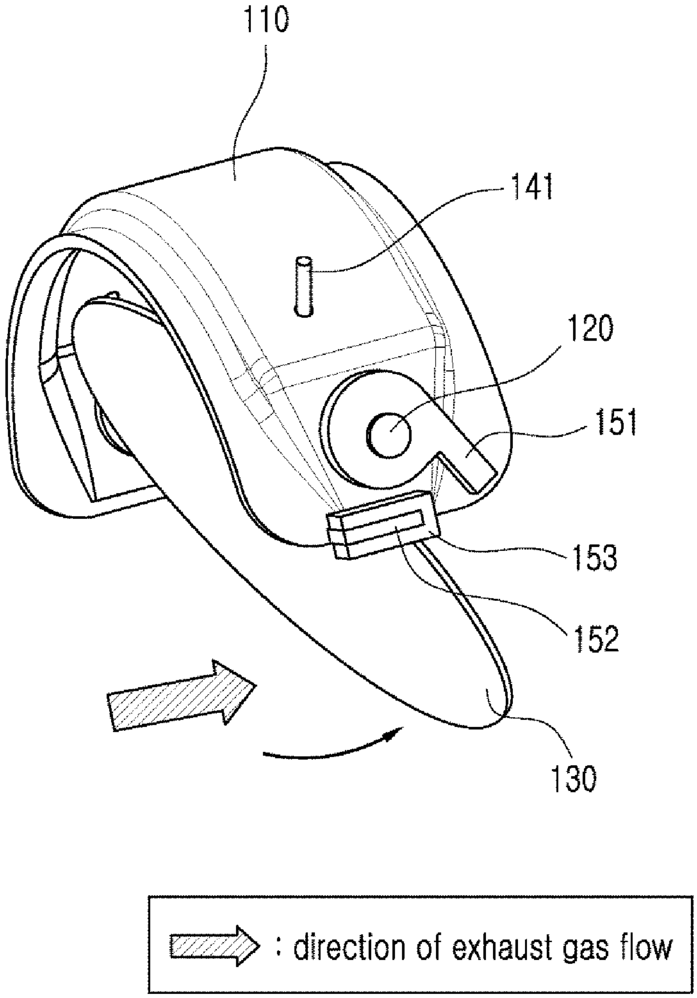
FIG. 6 is a drawing showing an operation state of a stopping unit.

FIG. 3 is a front elevational view of an exhaust valve for a muffler of FIG. 2, FIG. 4 is a rear elevational view of an exhaust valve for a muffler of FIG. 2, FIG. 5 is a left elevational view of an exhaust valve for a muffler of FIG. 2, and FIG. 6 is a drawing showing an operation state of a stopping unit.

An exhaust valve 100 for a muffler according to an embodiment of the present invention is mounted in tubes (designated by reference numerals 530, 540 and 550 in FIG. 9) inside a muffler (designated by a reference numeral 500 in FIG. 9), and as shown in FIG. 1 to FIG. 6, a mounting bracket 110, a shaft 120, a flap 130 and an elastic member 140.

Figure 10:
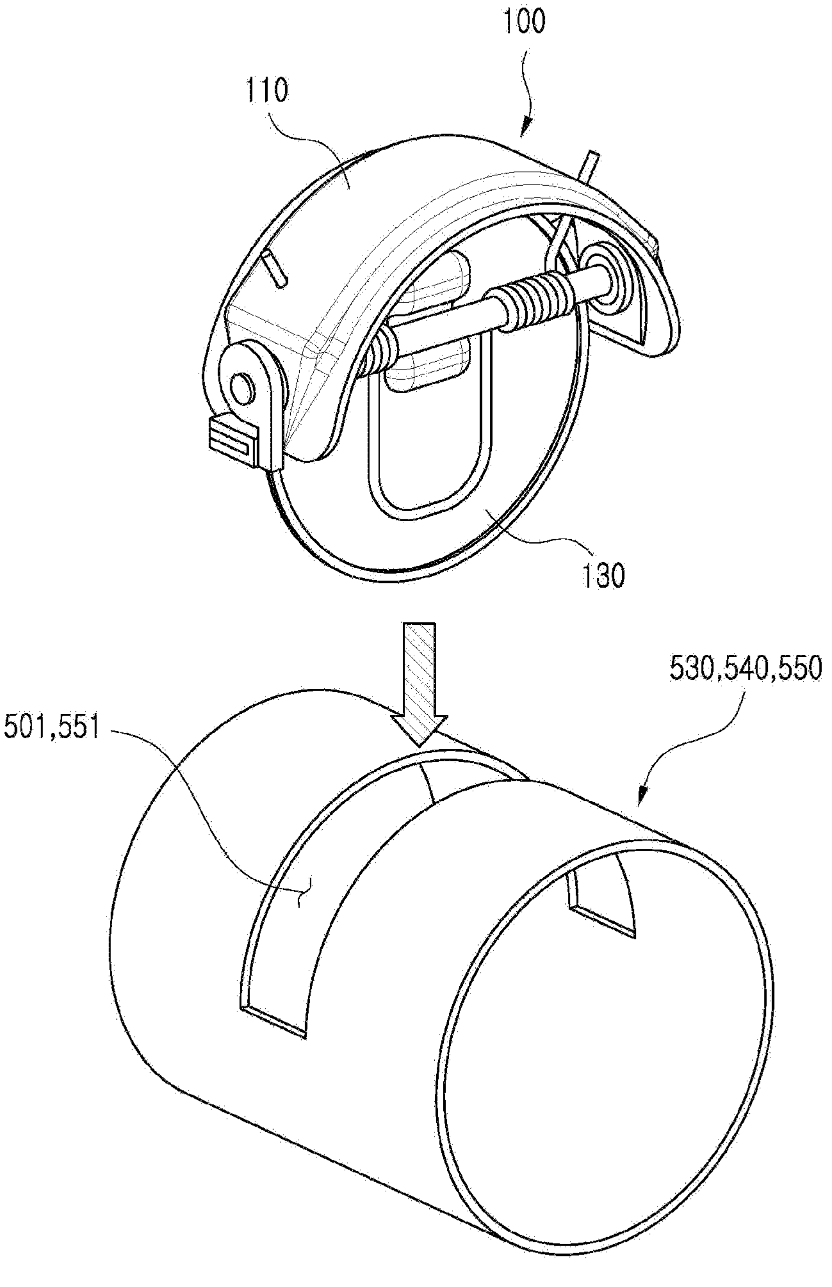
FIG. 10 is a drawing showing a state in which an exhaust valve for a muffler is mounted to an inlet pipe, an outlet pipe or an auxiliary pipe of a muffler.
Figure 11:
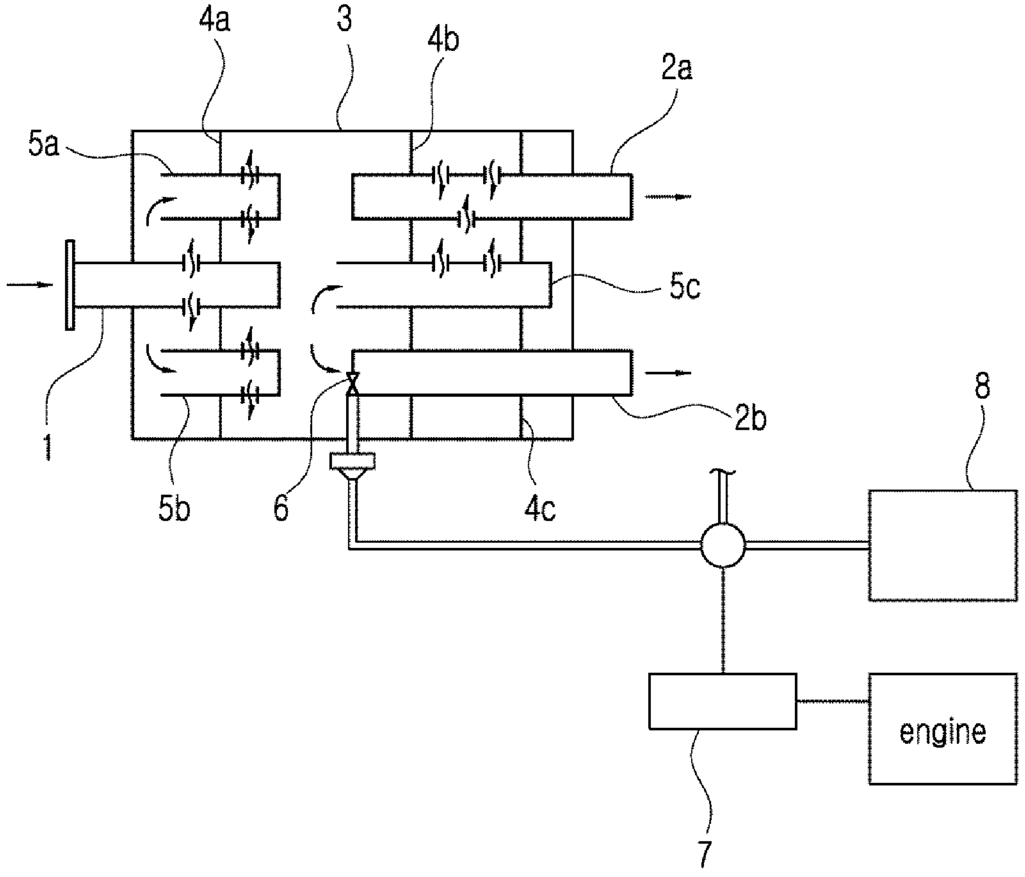
FIG. 11 is a drawing showing a conventional muffler.

The mounting bracket 110 has an arc shape as shown in FIG. 1 to FIG. 4 so as to be seated on an outer surface of the tube 530, 540 or 550 in a state of covering mounting holes 501 or 551 which is formed in the tube 530, 540 or 550, as shown in FIG. 10.

Further, as shown in FIG. 1 and FIG. 2, insert holes 111 may be formed in both ends of the mounting bracket 110 into which the shaft 120 may be inserted. Also, fixing holes 112 may be formed in the mounting bracket 110 into which ends of the elastic member 140 are inserted to be fixed.

The shaft 120 is rotatably connected to the mounting bracket 110 as shown in FIG. 1 to FIG. 6. For example, as shown in FIG. 1 to FIG. 4, both ends of the shaft 120 may be rotatable with respect to both ends of the mounting bracket 110. Further, as shown in FIG. 1, the shaft 120 may be inserted into the insert holes 111 of the mounting bracket 110 to be rotatable.

Further, the shaft 120 may be disposed to be offset from a center (designated by a reference numeral CL in FIG. 3) of the flap 130. For example, as shown in FIG. 3, the shaft 120 may be disposed to be offset from the center CL of the flap 130 toward the mounting bracket 110. Accordingly, an opening angle of the flap 130 can be regulated by an amount of the offset of the shaft 120 as well as an elastic force of the elastic member 140 in response to the force acting on the flap 130 due to the pressure of exhaust gas, so the opening angle and the opening time of the flap 130 can be precisely regulated.

Reference numerals B1 and B2 in FIG. 1 designate bushings which seal between the shaft 120 and the insert holes 111 of the mounting bracket 110.

The flap 130 is fixed to the shaft 120 so as to rotate together with the shaft 120 as shown in FIG. 1 to FIG. 3. For example, the flap 130 may be fixed to the shaft 120 by welding.

The pressure of the exhaust gas directly acts on the flap 130, and in order to use maximally the pressure of the exhaust gas, as shown in FIG. 1 to FIG. 3, the flap 130 may have a shape of a circular plate so as to block a portion of an inside space of the tube 530, 540 or 550.

The elastic member 140 elastically supports the flap 130 with respect to the mounting bracket 110. For example, a portion of the elastic member 140, as shown in FIG. 1 to FIG. 3, is fixed to the bracket 110, and a portion thereof elastically supports the flap 130. For example, as shown in FIG. 1 to FIG. 3, a torsion spring (hereinafter designated by reference numeral 140), a portion of which is wound around the shaft 120 in a type of a coil, may be used as the elastic member 140.

In detail, the torsion spring 140 may include a first portion 141 which forms an end portion to be fixed to the mounting bracket 110, a second portion 142 which is elastically supported by the flap 130 and forms a center portion, a third portion 143 which forms another end portion to be fixed to the mounting bracket 110, a fourth portion 144 which is wound around the shaft 120 in a type of a coil between the first and second portions 141 and 142, and a fifth portion 145 which is wound around the shaft 120 in a type of a coil between the second and third portions 142 and 143. Accordingly, the fourth and fifth portions 144 and 145 which are respectively wound in a type of a coil are disposed at both sides of the center portion of the shaft 120, so forces acting on the flap 130 by the torsion spring 140 are balanced so that the flap 130 can operate stably without being twisted.

Further, as shown in FIG. 3, the second portion of the torsion spring 140 is curved to have a shape of "U" so as to sufficiently support the flap 130.

Accordingly, since the mounting bracket 110, the shaft 120, the flap 130 and the elastic member 140 are designed as described above, the elastic force of the elastic member 140 can regulate the opening amount of the flap 130 in conformation with the pressure of exhaust gas by the harmony of the pressure of exhaust gas introduced into the muffler 500 via an outlet pipe and the elastic force of the elastic member 140 in a state of an idling state or a low RPM state of an engine, so that the exhaust noise can be reduced while maintaining an engine output, and in a state of a high RPM of an engine, the pressure of exhaust gas becomes much higher than the elastic force of the elastic member 140, so the opening amount of the flap 130 can be maximized so that the engine output may be maintained just like in a state that there is no exhaust valve.

In addition, as shown in FIG. 1 to FIG. 6, the exhaust valve 100 may further include a stopping unit 150 which stops the rotation of the flap 130 when the flap 130 is in a predetermined position.

As an example, as shown in FIG. 1 to FIG. 6, the driving unit 150 may include a stopping lever 151 and a stopping protrusion 152. The stopping lever 151 may be fixedly connected to an end of the shaft 120 so as to rotate together with the shaft 120, and the stopping protrusion 152 may be fixedly connected to the mounting bracket 110 such that the stopping lever 151 is blocked thereto when the flap 130 is in a closing position. At this time, as shown in FIG. 6, the stopping protrusion 152 is positioned in front of the stopping lever 151 in a direction of exhaust gas flow in order to allow the flap 130 to be rotated by the exhaust gas flow.

Further, the stopping unit 150 may further include a noise reducing member 153 which is provided to the stopping lever 151 or the stopping protrusion 152 to reduce noise when the stopping lever 151 collides with the stopping protrusion 152. For example, a case that the noise reducing member 153 is provided to the stopping protrusion 152 is shown in FIG. 1 to FIG. 6. The noise reducing member 153 may be a mat which is formed by weaving a wire mesh.

In addition, the exhaust valve 100 for a muffler may further include a seating portion 160 which allows a portion of the shaft 120 to be stably seated to the flap 130.

In case that the elastic member 140 is a torsion spring which is wounded around the shaft 120 as shown in the drawings, as shown in FIG. 1 to FIG. 3, the seating portion 160 is provided to the flap 130 to be protruded therefrom to provide a gap between the shaft 120 and the flap 130 so that the torsion spring 140 smoothly operates in the gap between the portion of the shaft 120 and the flap 130.

For example, the seating portion 160 may be disposed at a center portion of the shaft 120. Accordingly, in case that the seating portion 160 is disposed at the center portion of the shaft 120, the fourth and the fifth portions 144 and 145 of the torsion spring 140 which are wounded in a type of a coil are disposed in both sides of the center portion of the shaft 120, so that the flap 130 can be stably operated without being twisted due to the balance of forces.

The seating portion 160 may be formed to be integral with the flap 130 by a press forming or the like. On the other hand, the seating portion 160 may be coupled to the shaft 120 by welding or the like.

Hereinafter, referring to FIG. 7, an exhaust valve for a muffler according to another embodiment of the present invention will be described.

Figure 7:
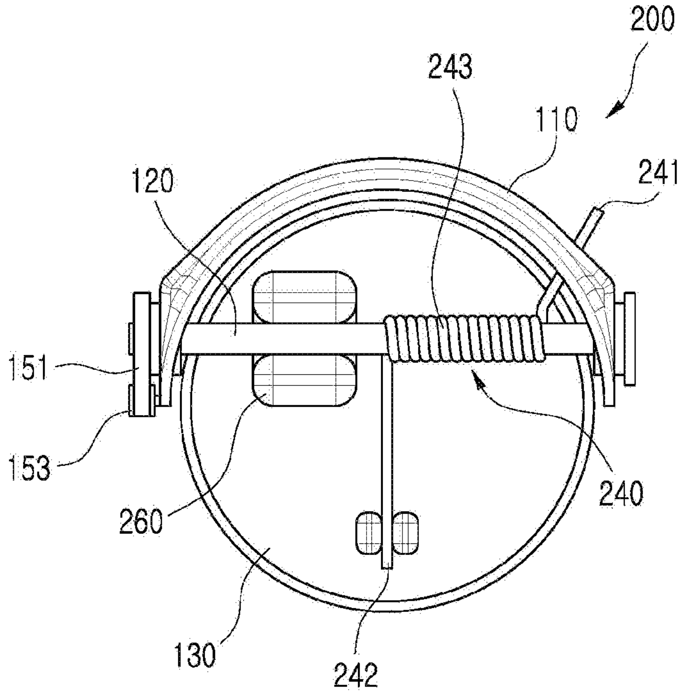
FIG. 7 is a front elevational view of an exhaust valve for a muffler according to another embodiment of the present invention.

FIG. 7 is a front elevational view of an exhaust valve for a muffler according to another embodiment of the present invention.

An exhaust valve 200 for a muffler according to another embodiment of the present invention is identical with the above-described embodiment except the position of a seating portion 260 and a torsion spring 240, so the seating portion 260 and the torsion spring 240 will be mainly described.

The seating portion 260 is disposed to be offset from a center portion of the shaft 120 as shown in FIG. 7. At this time, as shown in FIG. 7, the torsion spring 240 a first end portion 241 which is fixed to the mounting bracket 110, a second end portion 242 which is elastically supported by the flap 130 and a center portion 243 which is wound around the shaft 120 in a type of a coil and forms a portion between the first and the second end portions 241 and 242.

By these configuration, the size of the exhaust valve can be reduced.

Hereinafter, referring to FIG. 8, an exhaust valve for a muffler according to yet another embodiment of the present invention will be described.

Figure 8:
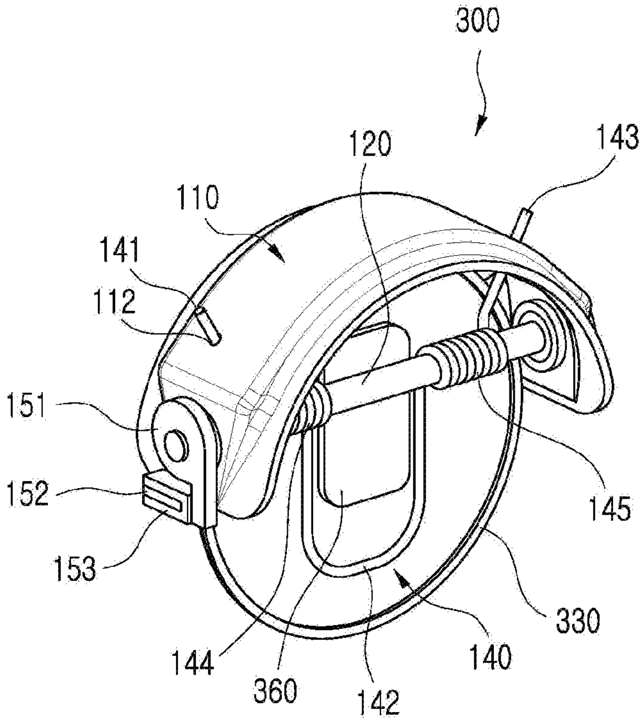
FIG. 8 is a perspective view of an exhaust valve for a muffler according to yet another embodiment of the present invention.

FIG. 8 is a perspective view of an exhaust valve for a muffler according to yet another embodiment of the present invention.

An exhaust valve 300 for a muffler according to yet another embodiment of the present invention is identical with the above-described embodiment except a seating portion 260 and a flap 330, so the seating portion 360 will be mainly described.

As shown in FIG. 8, the seating portion 360 may be a damper (hereinafter designated by the reference numeral 360) which is separately provided to the flap 330 and absorbs vibration. Accordingly, a gap between the shaft 120 and the flap 330 can be maintained and at the same time noise due to resonance of the flap 330 can be compensated. For example, one surface of the damper 360 may be fixed to the shaft 120 by welding or the like, and the other surface of the damper 360 may be fixed to the flap 330 by welding or the like.

Hereinafter, referring to FIG. 9 and FIG. 10, a muffler according to another embodiment of the present invention will be described.

Figure 9:
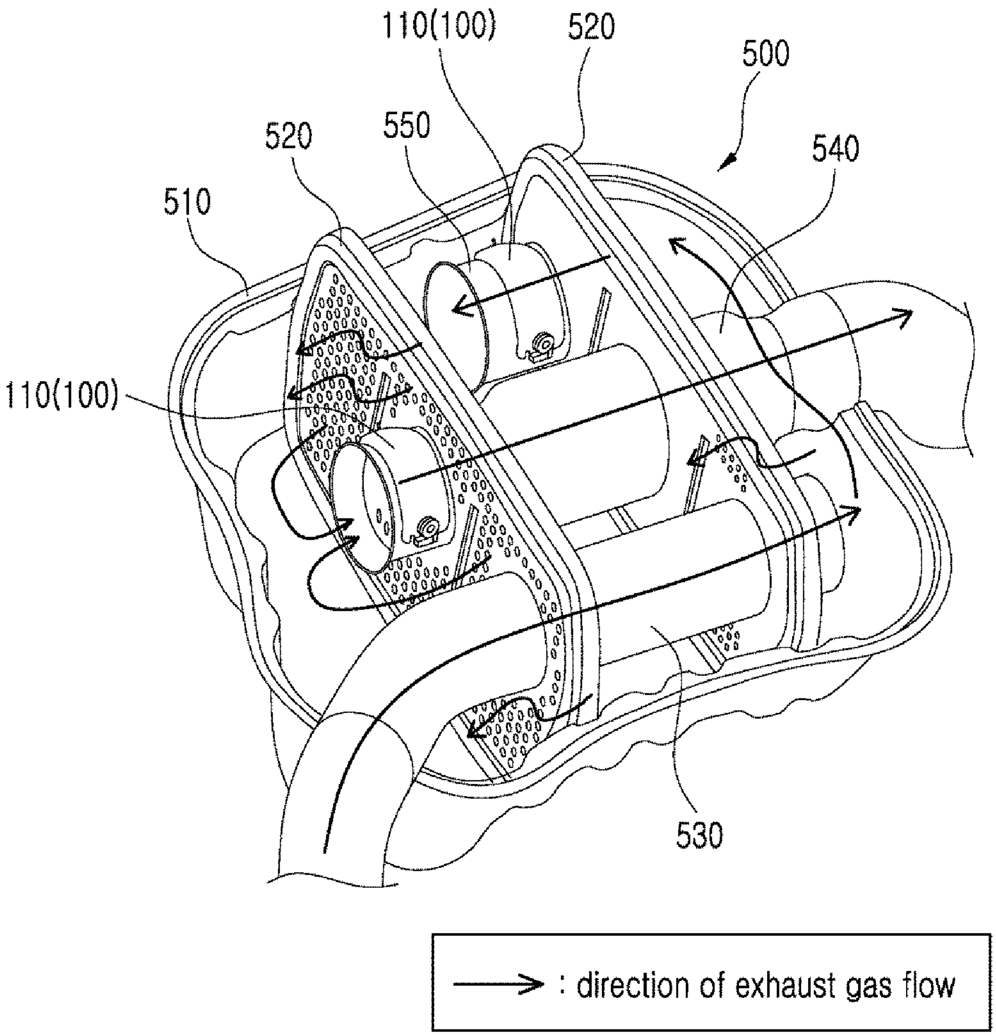
FIG. 9 is a drawing showing an exhaust valve for a muffler according to yet another embodiment of the present invention.

FIG. 9 is a drawing showing an exhaust valve for a muffler according to yet another embodiment of the present invention, and FIG. 10 is a drawing showing a state in which an exhaust valve for a muffler is mounted to an inlet pipe, an outlet pipe or an auxiliary pipe of a muffler.

A muffler 500 according to an embodiment of the present invention, as shown in FIG. 9, includes a muffler body 510 having a hollow inner space, a partitioning wall 520 partitioning the inner space of the muffler body 510 into plural spaces, an inlet pipe 530 introducing exhaust gas of an exhaust system into the muffler body 510 and an outlet pipe 540 discharging exhaust gas in the inner space of the muffler body 510.

Further, as shown in FIG. 10, a first mounting hole 501 is formed on the inlet pipe 530 or the outlet pipe 540 along a circumferential direction, and the exhaust valve 100, 200 or 300 which is described in the above is mounted in the first mounting hole 501. Accordingly, by simply forming the first mounting hole 501 in the prior inlet pipe 530 or the prior outlet pipe 540, the exhaust valve 100, 200 or 300 can be mounted, so the exhaust valve 100, 200 or 300 according to embodiments of the present invention can be used in the conventional muffler.

For example, as shown in FIG. 9 and FIG. 10, the flap 130 may be inserted into the first mounting hole 501, and the mounting bracket 110 may be fixed to the outer surface of the outlet pipe 540 by welding or the like in a state of covering the first mounting hole 501.

In addition, the muffler 500 according to another embodiment of the present invention may further include an auxiliary pipe 550 which penetrates the partitioning wall 520, and a second mounting hole 51 may be formed in the auxiliary pipe 550 along a circumferential direction thereof, and the exhaust valve 100, 200 or 300 according to the embodiments of the present invention may be mounted to the second mounting hole 551.

As described above, the exhaust valve 100, 200 or 300 according to embodiments of the present invention and the muffler 500 according to another embodiment of the present invention have the following advantages.

Since the mounting bracket 110, the shaft 120, the flap 130 or 330 and the elastic member 140 or 240 are designed as described above, the elastic force of the elastic member 140 or 240 can regulate the opening amount of the flap 130 or 330 in conformation with the pressure of exhaust gas by the harmony of the pressure of exhaust gas introduced into the muffler 500 via an outlet pipe and the elastic force of the elastic member 140 or 240 in a state of an idling state or a low RPM state of an engine, so that the exhaust noise can be reduced while maintaining an engine output, and in a state of a high RPM of an engine, the pressure of exhaust gas becomes much higher than the elastic force of the elastic member 140 or 240, so the opening amount of the flap 130 or 330 can be maximized so that the engine output may be maintained just like in a state that there is no exhaust valve.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An exhaust valve for a muffler mounted inside the muffler, comprising:

a mounting bracket having an arc shape;

a shaft rotatably connected to the mounting bracket;

a flap fixed to the shaft and rotates together with the shaft; and an elastic member elastically supporting the flap with respect to the mounting bracket, wherein both end portions of the shaft are rotatably connected respectively to both end portions of the mounting bracket, wherein insert holes are disposed at both end portions of the mounting bracket, and the shaft is disposed to be inserted into the insert holes, and wherein the flap has a shape of a circular plate having a same curvature with the arc shape of the mounting bracket, and the mounting bracket covers a portion of an outer circumference of the flap when the exhaust valve is in a closed state.

2. The exhaust valve of claim 1, wherein the shaft is disposed to be offset from a center of the flap.

3. The exhaust valve of claim 1, further comprising a stopping unit for stopping rotation of the flap.

4. The exhaust valve of claim 3, wherein the stopping unit comprises:

a stopping lever, wherein one end of the stopping lever is fixed to one end of the shaft so as to rotate together with the shaft; and a stopping protrusion fixed to the mounting bracket to block the stopping lever when the flap is in a closing position.

5. The exhaust valve of claim 4, wherein the stopping unit further comprises a noise reducing member provided to the stopping lever or the stopping protrusion to reduce noise when the stopping lever collides with the stopping protrusion.

6. The exhaust valve of claim 1, further comprising a seating portion which allows a portion of the shaft to be stably seated to the flap.

7. The exhaust valve of claim 6, wherein the elastic member is a torsion spring wound around the shaft, and wherein the seating portion is provided to the flap to be protruded therefrom to provide a gap between the shaft and the flap so that the torsion spring smoothly operates in the gap between the shaft and the flap.

8. The exhaust valve of claim 7, wherein the seating portion is disposed to be offset from a center portion of the shaft, and wherein the torsion spring comprises:

a first end portion fixed to the mounting bracket;

a second end portion elastically supported by the flap; and a center portion wound around the shaft in a shape of a coil and disposed between the first end portion and the second end portion.

9. The exhaust valve of claim 7, wherein the seating portion is disposed in a center portion of the shaft, and wherein the torsion spring comprises:

a first portion fixed to the mounting bracket and disposed at an end of the torsion spring;

a second portion elastically supported by the flap and disposed at a center portion of the torsion spring;

a third portion fixed to the mounting bracket and disposed at another end of the torsion spring;

a fourth portion wound around the shaft at one side portion of the shaft in a shape of a coil between the first and the second portions; and a fifth portion wound around the shaft at another side portion of the shaft in the shape of the coil between the second and the third portions.

10. The exhaust valve of claim 9, wherein the second portion of the torsion spring has a curved shape so as to support the flap.

11. The exhaust valve of claim 6, wherein the seating portion is integrally formed to the flap to be protruded, and wherein a portion of the shaft is fixed to the seating portion.

12. The exhaust valve of claim 6, wherein the seating portion is a damper separately provided to the flap and absorbing vibration, and wherein one surface of the damper is fixed to the shaft and another surface of the damper is fixed to the flap.

13. A muffler comprising:

a muffler body having a hollow inner space;

a partitioning wall partitioning the inner space of the muffler body into a plurality of spaces;

an inlet pipe introducing an exhaust gas into the muffler body; and an outlet pipe discharging the exhaust gas from the muffler body, wherein a first mounting hole is formed in the inlet pipe or the outlet pipe along a circumferential direction thereof, and wherein the exhaust valve of claim 1 is mounted to the first mounting hole.

14. The muffler of claim 13, wherein the flap is inserted into the first mounting hole, and wherein the mounting bracket is fixed to an outer surface of the inlet pipe or the outlet pipe in a state of covering the first mounting hole.

15. The muffler of claim 13, further comprising an auxiliary pipe penetrating the partitioning wall, wherein a second mounting hole is formed in the auxiliary pipe along a circumferential direction thereof and the exhaust valve is mounted to the second mounting hole.

* * * * *